June 22, 1954  J. F. VON ESSEN  2,681,749
SHAKER WITH VALVED CLOSING CAP
Filed Sept. 7, 1951

John F. Von Essen
INVENTOR.

BY *Clarence A. O'Brien*
*and Harvey B. Jacobson*
Attorneys

Patented June 22, 1954

2,681,749

UNITED STATES PATENT OFFICE 2,681,749

SHAKER WITH VALVED CLOSING CAP

John F. Von Essen, Floral Park, N. Y.

Application September 7, 1951, Serial No. 245,490

5 Claims. (Cl. 222—196.3)

The present invention relates to containers for dry granulated and equivalent powdered products and has more particular reference to a container with a shaker cap or equivalent closure, said cap having one or more discharge ports and accompanying valve means which is normally closed when the container is upright and automatically moved to an open or dispensing position when said container is inverted to assume a shaking or dispensing position.

Stated more specifically, one phase of the subject matter herein presented has to do with a sugar dispenser which is characterized by a truncated conical cap, a valve normally seated in the discharge opening and closing the latter, said valve having weighted rod means and said rod means having the additional function of an agitating element to break up and otherwise disintegrate sugar lumps which may be present in the contents of the container.

Another aspect of the invention relates to the above stated construction in conjunction with a cruciform or equivalent spider, the latter being interposed between the neck of the container and the attached portion of the discharge cap, said spider having a plurality of slidably and swingably mounted rods which descend into the sugar and which may be caused to vibrate by voluntary shaking motions imparted thereto by hand and to thus further assist in keeping the sugar in a constant, ready-to-flow state.

Further novelty has to do with a salt shaker having cap means and associated spider means, the cap means having valved discharge openings or shaker holes and the valves again being mounted on rods which are slidably associated with the spider means and which normally descend into the salt in the shaker to assist in keeping it in constantly usable condition.

Other objects and advantages will become more readily apparent from the following description and the accompanying sheet of illustrative drawings.

In the accompanying sheet of drawings, wherein like numerals are employed to designate like parts throughout the views.

Figure 1:
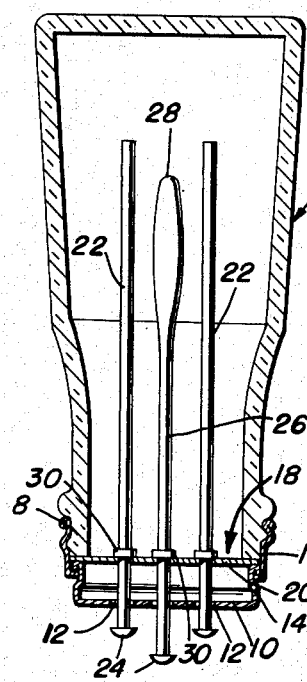
Figure 1 is a view in section and elevation of a salt shaker in an inverted position with the valves open.
Figure 2:
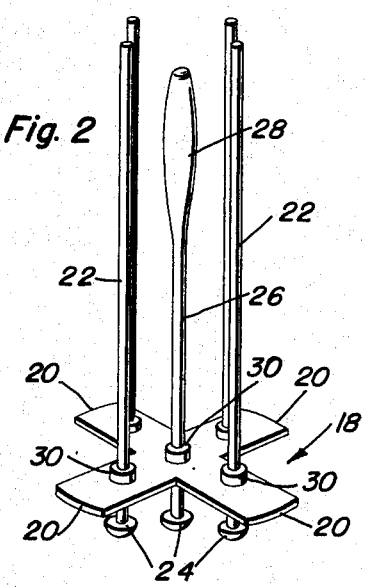
Figure 2 is a perspective view of the spider and valve rod assembly.

Attention is first directed to Figures 1 and 2 showing the salt shaker. The salt shaker is of any suitable size and shape and material and the container portion is denoted by the numeral 6, the same having a screw-threaded discharge neck 8 for the cap 10. The cap is here provided with a plurality of shaker holes 12 and has a flanged wall or rim 14 which is formed with a bead and joined with a flanged ring 16 which is screw-threaded and provides a swivel connection between itself and the cap but actually becomes a clamp when it is fully tightened. This provides a highly desirable arrangement for holding in place the valve rod and spider assembly means. The spider proper is denoted by the numeral 18 and it is of cruciform construction and embodies four equidistant circumferentially spaced arms 20—20. The spider is centrally apertured and also each of the arms is provided with an aperture, these apertures being lined up with coacting shaker holes 12 in the cap 10 as shown to advantage in Figure 1. There are valve rods for each of the shaker holes 20 and each is the same in construction. That is to say, each rod is weighty and elongated and is denoted by the numeral 22. The rod normally depends into the receptacle portion of the container. The outer end of the rod is provided with a convex head 24 which constitutes a valve and which normally closes the coacting port or hole 12, in an obvious manner. The center rod is denoted, for convenience of description, by the numeral 26 and it is different from the other rods only in that the inner end has a bulbous-shaped enlargement 28 which provides an extra weight. All of the rods have stop collars 30 thereon and the stop collars engage with the apertured portions of the coacting parts of the spider 18. Thus, the distances that the rods travel outwardly to open positions is limited by the collars coacting with the apertured portions of the spider. Reviewing this arrangement, the cap means holds the spider means between itself and the neck of the container. The spider and cap are in close spaced parallelism. The coacting portions of the rods are such that they bridge the space between the spider and cap and allow the valve heads 24 to seat properly. In the form of the invention shown, the shaker is inverted or upside down, as is obvious. It is likewise obvious that when the shaker is uprighted, the forces of gravity will act on the rods and the rods will drop through the openings in the cap and spider and the valves will seat and close the discharge holes 12. Consequently, the salt will be kept dry because of this closed valve action. On the other hand, when the shaker is turned upside down for salting foods, the valves not only open up automatically but the action of the rods is such that their free agitating and vibrating motions tend to loosen up what would otherwise be packed salt in the container.

Figure 3:
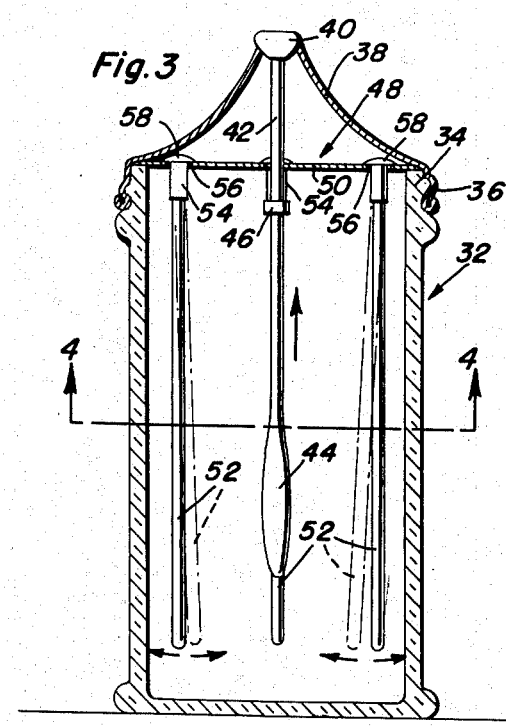
Figure 3 is a view of a sugar dispenser of the shaker type, said view being partly in section and partly in elevation with the container in its normal or upright position.
Figure 4:
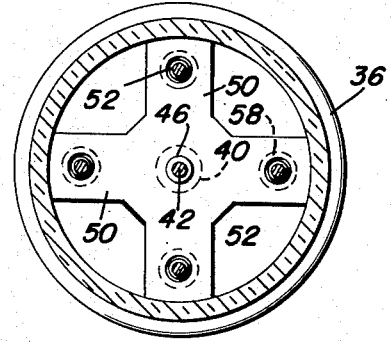
Figure 4 is a cross-section on the line 4—4 of Figure 3, looking in the direction of the arrows.

The same general principles apply to the modification shown as a sugar dispenser in Figures 3 and 4. Here, the container is denoted by the numeral 32 and said container has a screw-threaded neck 34 to accommodate the screw-threaded rim portion 36 of the truncated conical cap 38. The sugar is, of course, discharged through the single center opening in a well known manner. It is to be noted, however, that there is a valve 40 provided and this normally seats itself and closes the discharge opening, said valve being carried on a rod 42 which depends into the container, said rod having a bulbous shaped weight 44 on its inner end and having a stop collar 46 intermediate its ends. Here again, the rod slides through a cruciform spider which is here denoted by the numeral 48. The spider has circumferentially spaced or equidistant arms 50 as shown in Figure 4 and said arms have openings therein. At the center of the spider there is an opening for the rod 42 and it is with this apertured portion of the spider that the top portion 46 engages when the sugar shaker is inverted for discharging sugar in a well known manner. In addition to the main weighted valving rod, there are other rods 52 provided. These are not necessarily valving rods but they are more in the nature of agitating rods. They depend into the sugar and have a pendulous motion as denoted in dotted lines for breaking up sugar lumps and keeping the sugar generally in a ready-to-flow condition or state. Each rod has an enlarged portion 54 which is operable in a relatively large opening 56 in the coacting spider arm. There is also a suitably shaped head 58 which holds the rod properly assembled. Here, the heads do not necessarily function as valves. They do, however, come into contact with the peripheral or marginal portion of the cap 38 and thus limit the sliding motion of the rods through the apertures in the arms 50.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A salt shaker comprising a container, cap means mounted on said container, said cap means having shaker openings therein, a spider cooperating with and interposed between the cap means and a cooperating portion of the container and in alignment with said cap means, said spider having arms, and each arm having a rod accommodating and guiding aperture therein, valves normally closing the shaker openings in said cap means, each valve including a linearly straight rod and said rod being slidable through and freely swingable relative to the aperture means provided therefor in a cooperating arm portion of said spider, and all of said rods having stop collars engageable with the adjacent cooperating arms of said spider.

2. A shaker construction comprising a container, an apertured shaker cap, a ring encircling and separably mounting said cap on said container, a spider interposed between said cap and container, said spider having apertures in alignment with other apertures in said cap, a plurality of linearly straight rods slidably and pendulously mounted in coacting apertures in the cap and spider, each rod having a stop shoulder engageable with said spider and each rod being provided at its outer end with an enlarged head coacting with the adjacent aperture in said cap and functioning as a cut-off valve.

3. A sugar dispenser comprising a container having a truncated conical discharge cap with a dispensing opening therein, a spider interposed between the cap and container, said spider having a central opening, a linearly straight rod slidable through said central opening, said rod being provided at its outer end with a valve head normally closing the dispensing opening in said cap, the inner end portion only of said rod being weighted and the intermediate portion of said rod having a stop shoulder coacting with the spider.

4. The structure specified in claim 3 and a plurality of additional rods slidably and swingably mounted on said spider.

5. An agitator device for use in a sugar shaker comprising a spider having a central opening, a linearly straight rod slidable and swingable in said opening and provided on one end with a valve head, provided intermediate its ends with a stop shoulder and provided on its opposite end with an enlargement providing a weight, said spider including arms and said arms each having an aperture, a straight rod slidably and swingably mounted in the aperture in each arm, said rod having a head coacting with the aperture in the complemental arm.

References Cited in the file of this patent

UNITED STATES PATENTS

| Number | Name | Date |
|---|---|---|
| 1,592,035 | Massuere | July 13, 1926 |
| 1,664,068 | Fisher | Mar. 27, 1928 |
| 2,185,896 | Jones | Jan. 2, 1940 |
| 2,480,421 | Ransom | Aug. 30, 1949 |